Figure 1:
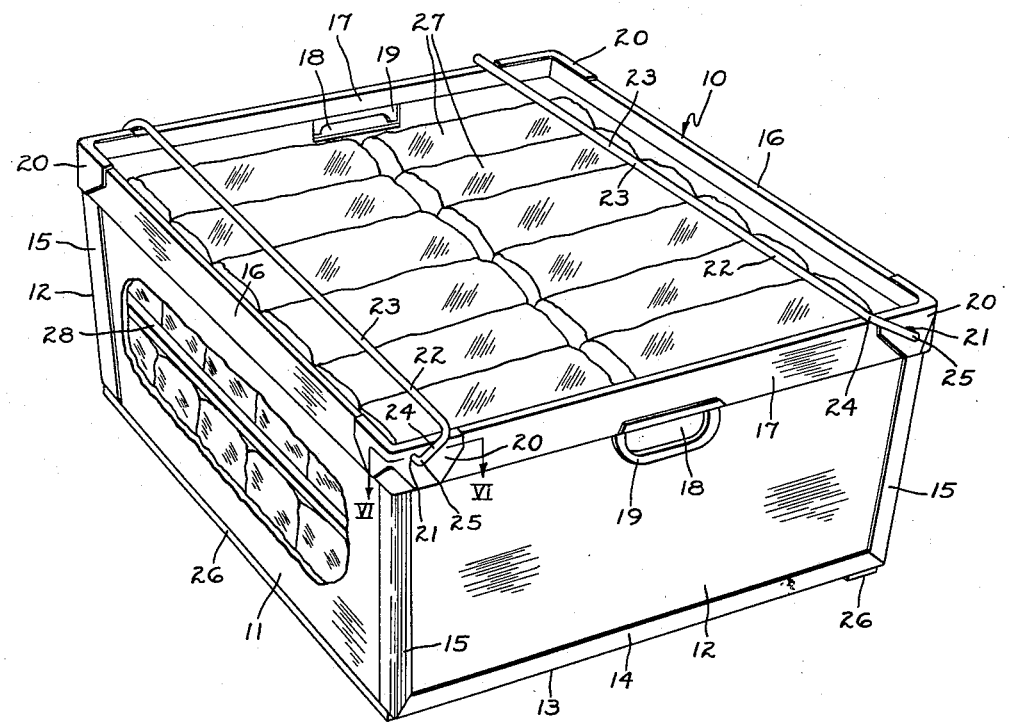

Dec. 16, 1958  E. T. JOHNSON  2,864,530
RECEPTACLE
Filed Sept. 2, 1955  3 Sheets-Sheet 1

INVENTOR.
Edward T. Johnson
BY
Norman S. Blodgett
Attorney

Dec. 16, 1958 — E. T. JOHNSON — 2,864,530
RECEPTACLE

Filed Sept. 2, 1955 — 3 Sheets-Sheet 3

INVENTOR.
Edward T. Johnson
BY Norman S. Blodgett
Attorney

10 United States Patent Office 2,864,530
Patented Dec. 16, 1958

2,864,530

RECEPTACLE

Edward T. Johnson, Worcester, Mass.

Application September 2, 1955, Serial No. 532,237

1 Claim. (Cl. 220—97)

This invention relates to receptacles and more particularly to containers used by bakers for the transportation and handling of loaves of bread and the like.

It is common practice in the materials handling art to provide carrying boxes which can be stacked when full and which may be nested when empty. In the baking industry it is necessary to carry loaves of bread in large quantities from the bakery to the retailer; the containers must be such that a considerable number of loaves may be carried from the bakery truck into the retail store without an undue number of trips and, yet, must be light enough to permit handling by one man. Certain types of light wooden containers have been evolved over the years for this service, but these receptacles of the prior art suffer from many disabilities. For instance, the bread must be carried on end, causing shortened loaves and wrinkled wrappers, making for a less saleable product. It has been difficult to remove a top container high in a stack without dragging the rearward end of the container over the bread in the next container, thus disrupting the wrappers. Also, bails, where provided, have been easily pulled from their hinges or connectors and the means of supporting the containers in nested condition have been easily damaged. These and other defects in the previously-known devices are obviated in a novel manner by the present invention.

It is therefore an outstanding object of the invention to provide a receptacle which may be selectively stacked or nested with similar receptacles.

It is a further object of this invention to provide a rugged and inexpensive materials handling container which will carry a maximum load but is, nevertheless, very light in weight and which has a long life of useful service.

Another object of the invention is the provision of a stockable receptacle having a hinged bail connection that will not pull apart.

A still further object of the present invention is the provision of a bakers' receptacle which will permit the flat packing of bread and will permit nesting when the receptacle is only half empty.

It is also an object of the instant invention to provide a receptacle having a nesting arrangement which is not easily damaged.

A further object of the invention is the provision of a receptacle which may be stacked with similar receptacles without danger of sliding between them and, yet, so constructed that the uppermost receptacle may be removed by sliding relative to the remainder of the stack without damage to articles carried in an underlying receptacle.

With these and other objects in view, as will be apparent to those skilled in the art, the invention resides in the combination of parts set forth in the specification and covered by the claims appended hereto.

Figure 2:
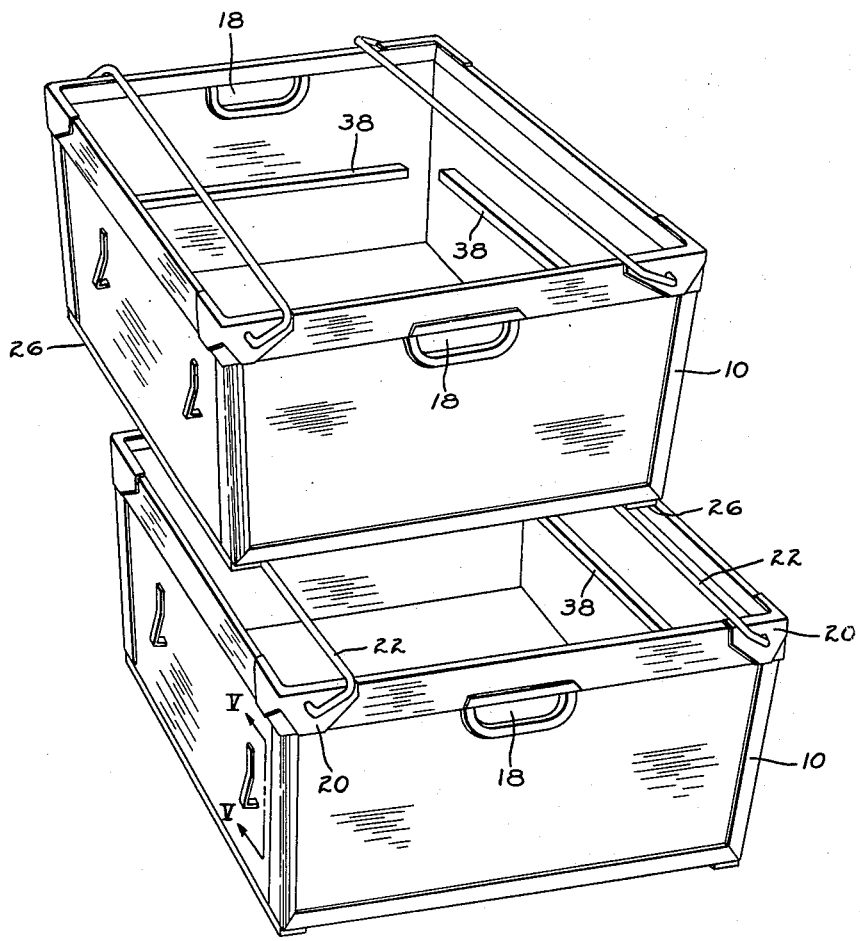
Figure 3:
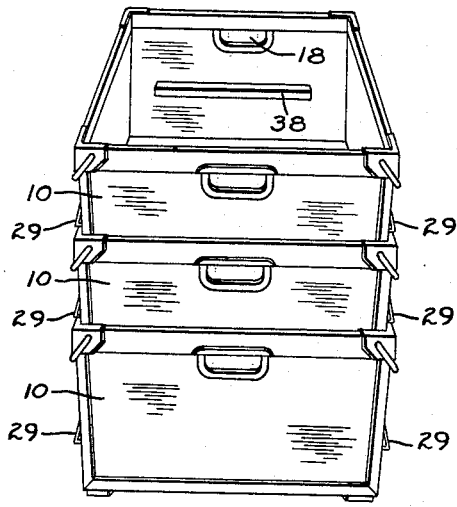
Figure 4:
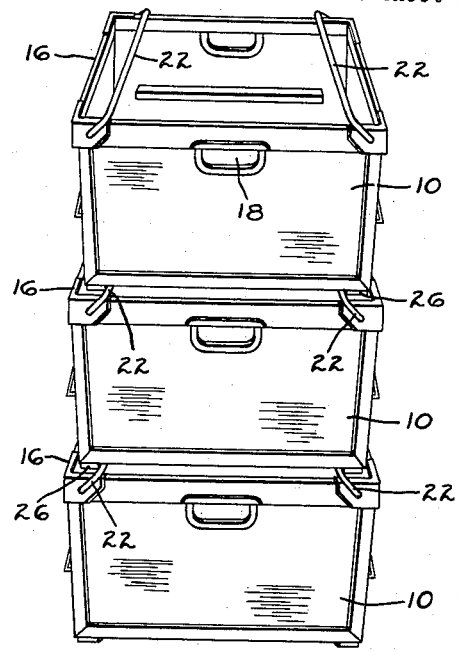
Figure 5:
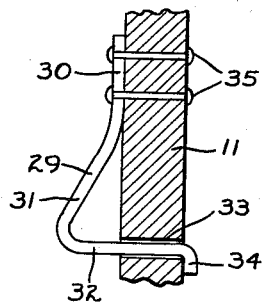
Figure 6:
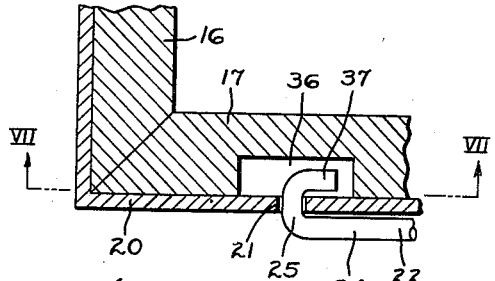
Figure 7:
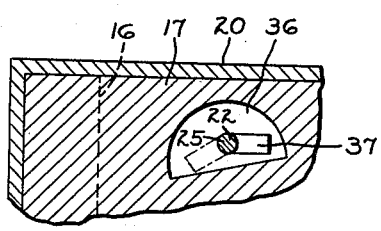

The character of the invention, however, may be best understood by reference to certain of its structural forms, as illustrated by the accompanying drawings in which:

Figure 1 is a perspective view of the receptacle of the invention with a portion broken away to show the contents clearly, Figure 2 shows two stacked receptacles during removal of the upper one, Figure 3 shows a plurality of receptacles in nested condition, Figure 4 shows a plurality of receptacles in stacked condition, Figure 5 shows an enlarged sectional view of a portion of the receptacle taken on the line V—V of Figure 2, Figure 6 is an enlarged sectional view of the receptacle taken on the line VI—VI of Figure 1, and Figure 7 is a sectional view of the receptacle taken on the line VII—VII of Figure 6.

Referring first to Figure 1, wherein is best shown the general features of the invention, the receptacle of the invention, designated generally by the reference character 10, is shown as an open-topped tray tapering from the top to the bottom. The receptacle 10 is formed by sides 11, ends 12, and bottom 13, these members being formed of plywood. The corners formed by the bottom 13 and the ends 12 are covered by reinforcing angles 14 formed of sheet metal. The corners formed by the sides 11 and the ends 12 are reinforced by means of sheet metal angles 15. Along the top edges of the sides and ends are arranged side rails 16 and end rails 17 formed of hardwood; these rails project outwardly beyond their respective sides and ends by a considerable amount. Handle apertures 18 are cut in the upper portions of the ends 12 just under the end rails 17 and a metal escutcheon 19 of sheet metal is formed around the aperture to protect the wood from wear and the users hands from abrasion. Each corner formed by the intersection of a side and an end rail is reinforced by a one-piece sheet metal corner plate 20 which not only covers the upper edges of the rails at the corners but also extends along the broad vertical surfaces of the rails. Each of the portions of these corner plates which extends along the vertical surface of an end rail 17 is provided with a small circular aperture 21 into which extends an end of a bail 22 formed of heavy metal rod, preferably spring steel. Each bail 22 comprises a long, straight intermediate portion 23 having a degree of stiffness sufficient, when supported at its ends, to support another loaded receptacle in its middle without appreciable bending. At each end of the intermediate portion each bail is bent at a right angle to form a connecting portion 24; the downward end of each connecting member is provided with a hinge portion 25 extending at a right angle thereto and extending into an aperture 21.

Extending along the bottom 13 under and flush with each side 11 is a skid strip 26. These strips do not extend completely from end to end of the receptacle, but stop somewhat short of the ends, as is evident from Figure 1. It should be noted, also, that the distance between the inner edges of the skid strips is approximately the same as the distance between the outermost surfaces of the intermediate portions 23 of the bails when the latter are resting on the top edges of the end rails, as shown in Figure 1. As is evident in the drawing, the articles such as loaves 27 of bread are arranged in the receptacle and the upper layer rests on a dividing member 28.

In Figure 5 is shown the details of a nesting cleat 29 which is not evident in Figure 1 because of the fact that the side 11 is broken away in that view, but is shown clearly in Figures 2, 3 and 4. The nesting cleat 29 is formed of sheet metal and is bent to provide at one end an attaching portion 30. From the vertical attaching portion the cleat is bent outwardly to form an inclined portion 31, then inwardly and horizontally to form a supporting portion 32. The supporting portion extends through a slot 33 in the side 11 and is bent downwardly on the inside of the receptacle to form a locking portion 34. Rivets 35 are used to fasten the cleat firmly to the receptacle.

In Figures 6 and 7 is best shown the particular manner in which each bail 22 is connected to an end rail 17. A side rail 16 and an end rail 17 form a corner which is reinforced by a corner plate 20. The bail 22 is shown with its connecting portion 24 lying against the outer surface of the corner plate and its hinge portion 25 extending through the aperture 21 in the plate. The end rail 17 is provided with a recess 36 into which the hinge portion projects; within the recess the bail is bent again at a right angle to form a locking portion 37. The recess is of a generally semi-circular shape to permit the locking portion to move freely about in the recess when the bail is pivoted about the axis defined by the hinge portion 25 and the aperture 21. The extreme positions of the locking member 37 are shown approximately by the solid line and dotted line showings in Figure 7.

It should be noted, as is evident in Figure 2, that the inside surface of the receptacle is provided with elongated horizontal wooden cleats 38 located approximately halfway between the top and bottom.

The operation of the invention will now be clearly understood in view of the above description. As shown in Figure 1, a first layer of loaves 27 of bread or the like is placed on the bottom 13 of the receptacle. Then, the dividing member 28 is placed thereover, resting on the cleats 38. Another layer of loaves is placed on the dividing member and the receptacle is loaded and ready for distribution. The depth of the receptacle is selected so that the cleats 38 are well above the tops of the first layer of loaves and so that the top edge of the receptacle is some distance above the tops of the second layer. When the receptacle is placed in the truck for distribution, it is inserted through the rear door of the truck with the skid strips 26 running longitudinally of the truck. If, for one reason or another, the sides 11 of the receptacle are considerably longer than the ends 12, it is evident that it is even more necessary that the skid strips be parallel to the sides and that the sides be aligned longitudinally of the truck for reasons of stability and ease of insertion and removal. In order to stock a plurality of receptacles in the delivery truck, the bails 22 are rotated about their hinge portions 25 to the position shown in Figure 1 wherein the intermediate portion 23 rests on the upper edges of the end rails 17. Each succeeding receptacle is placed with each of its skid strips 26 residing between a bail 22 and an upper edge of a side rail 16 of the next lower receptacle; because of the dimensional relationship, the intermediate portions 23 of the bails on a particular receptacle are forced toward one another because of the fact that they are wedged between the two skid strips of the next higher receptacle. This assures that no sideways relative motion takes place between two stocked receptacles. Furthermore, very little relative motion in an endways direction can take place between the skid strips which lie below the upper edges of the end rails and will strike them if motion takes place in one direction. When the truck reaches a place of delivery, such as a grocery store, the driver will wish to carry the receptacle into the store. He places his hand in the handle aperture 18 of the uppermost receptacle and lifts the end nearest himself while pulling toward him; he then rests the skid strips 26 on the upper edge of the end rail 17 closest to himself. The rail is protected by the corner plates 20 from abrasion by the strips. The driver then continues to pull the receptacle toward him, the receptacle being slidably supported at the forward end by the engagement of the skid strips with the rail and at the rearward end by the contact between the bails and the bottom 13 of the receptacle adjacent the strips. This situation is clearly shown in Figure 2, which view shows the arrangement as it would appear from inside the truck. It is evident, then, that the rearward end of the receptacle is supported well above the tops of the loaves of bread during the removal of an upper receptacle. When empty receptacles begin to accumulate during the distribution process, they are stocked by the driver in the manner shown in Figure 3. As one receptacle is dropped into another empty one, the cleats 29 rest on the upper edges of the side rails 16, the supporting portion 32 of the cleat making the actual contact. It is to be noted that the upper receptacle does not rest in the inner cleats 38 of the lower receptacle, since it has been discovered that such a means of support would cause rapid deterioration of the inner wooden cleats and would shorten the useful life of the receptacle. It is interesting to note that the bails 22 would normally be rotated about their hinge portions 25 into a position wherein the intermediate portion 23 lies under the side rail 16 against the sides 11. He would do this in order to facilitate the removal of the loaves from the receptacle and the bails remain in this position for stacking. Incidentally, the stacking may take place when the receptacles are only half-empty, since the bottom and skid strips of an upper receptacle lie well above the tops of the lower layer of loaves during nesting.

It can be seen, then, that the construction shown and described accomplishes the many objectives sought by workers in the art. In particular, it should be noted that the ability to use a very slight taper from bottom to top comes about because of the fact that the receptacles are constructed to nest only halfway and because of the fact that the cleats 29 support the sides and ends of the upper receptacle out of contact with the lower receptacles so that sticking is avoided. If complete nesting were used, the taper would have to be considerably greater than that used in the present invention so that the nested receptacles could be easily removed. The small taper used in the present case brings about certain beneficial effects. For instance, the capacity is increased so that it is possible to carry more bread. Also, the intermediate portions of the bails can be closer to the top edges of the side rails, due to the fact that the width of the bottom of the receptacle is not appreciably greater than the width at the top; one advantage of this is that in the inoperative position, the bails lie well under the lower edge of the rails and are out of the way. Then, of course, a smaller taper means a more stable container, i. e., one that is less likely to tip over.

It is obvious that minor changes may be made in the form and construction of the invention without departing from the material spirit thereof. It is, however, desired to confine the invention to the exact form herein shown and described, but it is desired to include all such as properly come within the scope claimed.

The invention having been thus described, what is claimed as new and desired to secure by Letters Patent is:

A wooden receptacle for selective nesting or stacking, comprising two downwardly-tapered sides, two downwardly-tapered ends, a rectangular bottom, side and end rails attached to the upper edges of the respective sides and ends, metallic corner plates covering the upper edges and outwardly-facing surfaces of the rails at the intersections thereof, elongated skid strips attached to the bottom and extending under and parallel to the sides, bails formed of metallic rod, each having a hinging portion extending through an aperture in a corner plate, each bail having a straight intermediate portion which, during stacking, lies across the upper edges of the end rails and parallel to the sides and which, during nesting, lies against a side under the side rail externally of the receptacle, each end of each of the bails having a locking portion lying within a closed recess in one of the end rails, and metallic cleats fastened to the sides for engaging an underlying receptacle during nesting, the hinging portion of each bail being bent at a right angle to form a locking portion which lies on the inner side of the aperture in a corner plate, and a recess formed in the end rail and covered by the corner plate in which the locking portion lies, the recess being formed to accommodate the motion of the locking member when the bail is moved, each metallic cleat consisting of a portion adapted to lie flat against a side and be fastened thereto, an outwardly- and downwardly-inclined portion, and a horizontal supporting portion extending from the lower end of the inclined portion, the supporting portion extending through the side into the interior of the receptacle and being bent at a right angle therein to form a locking portion.

References Cited in the file of this patent

UNITED STATES PATENTS

| | | |
|---|---|---|
| 212,701 | Hubbard | Feb. 25, 1879 |
| 2,087,944 | Brown | July 27, 1937 |
| 2,112,451 | Best et al. | Mar. 21, 1938 |
| 2,154,538 | Stivers | Apr. 18, 1939 |
| 2,244,841 | Johnson | June 10, 1941 |
| 2,297,097 | Best | Sept. 29, 1942 |
| 2,546,452 | Kmieliauskas | Mar. 27, 1951 |
| 2,763,395 | Meek | Sept. 18, 1956 |